2,870,058
FUNGICIDE-OIL FORMULATIONS

Donald J. Loder, Wilmington, Del., assignor to E. I. du Pont de Nemours and Company, Wilmington, Del., a corporation of Delaware No Drawing. Application December 2, 1955
Serial No. 550,748

3 Claims. (Cl. 167—42)

This invention relates to fluid fungicidal compositions containing a finely divided solid fungicide dispersed in an organic liquid, and to the manufacture thereof.

I have discovered an outstanding type of concentrated fungicidal composition. These concentrated compositions consist of a single liquid phase throughout which is dispersed a large amount of solid discrete particles of fungicidally active material. More specifically, my concentrated compositions comprise a finely divided fungicidally active compound in a deagglomerated state homogeneously dispersed in a non-solvent organic liquid medium.

Any fungicially active compound that is insoluble in the particular organic liquid can be employed in my compositions. However, the practice of my invention has by far its greatest utility in preparing compositions containing an insoluble fungicidally active thiuram disulfide or dithiocarbamate.

Thus the preferred compositions of my invention contain, as the fungicidally active ingredient, a compound such as manganese or zinc ethylenebisdithiocarbamate; ferric, zinc or manganese dimethyl dithiocarbamate; or tetramethyl or tetraethyl thiuram disulfides or monosulfides. Various other fungicidally active dithiocarbamates are set forth in Tisdale and Williams Patent No. 1,972,961.

These preferred formulations are characterized by outstanding physical and chemical stability, and outstandingly effective fungicidal activity.

The non-solvent organic liquids used in my compositions are those that do not dissolve more than about 0.1% by weight of the fungicidally active ingredient at 30° C. Where the composition is to be extended with water and an emulsion is desired, the organic liquid should also be water immiscible; that is, it should have a solubility in water of less than 5% by weight at 30° C. Organic liquids having a viscosity in the range of about 25 to 10,000 Saybolt Universal seconds (S. U. S.) at 100° F. are preferred because they lend themselves much more readily to the hereinafter described milling step in the preparation of my compositions. If the composition is to be used to treat living plants the organic liquid should, of course, be relatively non-phytotoxic. For most industrial usages the organic liquid need not be non-phytotoxic.

Typical of the preferred organic liquids that are non-phytotoxic and water miscible are isopropanol, ethylene glycol, glycerol, butanol, diethylene glycol and sorbitol. Typical preferred water immsicible organic liquids are deodorized kerosene and mixed isoparaffins in the boiling range of from 250° F. to 650° F. When the composition is to be used on fruit or foilage that is tolerant to oil, heavier fractions of "white oils" with viscosity from 50–350 S. U. S. at 100° F. can be used.

Other ingredients can also be present in my compositions. For example, where extremely high concentrations of the active ingredient are desired, a dispersing agent ordinarily will be included to promote the dispersion of the fungicide in the organic liquid. Typical of these dispersing agents are: soya lecithin, oleic acid and polyethylene glycol 400 dioleate. Also in some cases it is desirable to include a suspending agent to improve storage stability of the compositions. Materials such as "Thixcin" marketed by the Baker Castor Oil Company, estersils, and hydrophobed bentonite such as "Bentone" 34 marketed by the National Lead Company can be used for this purpose.

Where the organic liquid of my fungicidal concentrates is water immiscible, and so designed to be emulsified with water, it should also contain an emulsifying agent in amount sufficient to impart water dispersibility to the concentrate. Complete solubility in the oil is not required since excess emulsifier is adsorbed by the solid and is prevented from separating as a continuous third phase.

The best emulsifying agents for effecting a dispersion in water of my oil concentrates are the non-ionic type. Illustrative of such emulsifying agents are polyoxyethylene derivatives of sorbitan esters of long chain fatty acids such as the product currently marketed as "Tween" 81, alkylated aryl polyether alcohols such as the product "Triton" X–45, and fatty acid condensation products of polyhydric alcohols such as the proprietary product "Emcol" H–56.

Anionic oil-in-water emulsifying agents can also be used. The most useful of this type are salts of long carbon chain sulfates or long carbon chain sulfonates and similar anionic materials which are not easily precipitated in hard water. Thus salts such as sodium oleate and sodium stearate are much less desirable because the anion is precipitated in hard water.

Illustrative of the more effective anionic emulsifying agents are amine salts of sulfonated animal and vegetable oils, salts of sulfonated fish and castor oils and the diethyl cyclohexyl amine salt of dodecyl sulfate.

Other nonionic and anionic emulsifying agents are listed in detail in the U. S. Department of Agriculture Bulletin E–607 and in articles by McCutcheon in "Soap and Sanitary Chemicals," August, September and October of 1949.

The compositions of my invention are prepared by first mixing the fungicidally active ingredient with the organic liquid and then grinding or milling the mixture in such a way as to provde extremely vigorous shearing action. The severe shear-milling breaks up the solid agglomerates; but more important, it disperses the particles throughout the compositions in such a way that the resultant homogeneous suspension is extremely stable.

It is important that the average particle size of the fungicide in my composition be quite small, preferably less than about 5 microns in diameter as determined by optical microscopy. The small particle size is necessary to give the desired stability to the suspensions and to impart the greatly improved activity exhibited by my compositions.

To obtain the fungicidally active ingredient in the desired particle size, it can be ground dry using such fine grinding equipment as jet impact mills and ball mills. However, a more convenient procedure is to effect the desired particle size reduction while imparting the requisite shearing action to the organic liquid-fungicide mixture. Thus, the particle size reduction and the milling of the mixture can be accomplished simultaneously in apparatus such as a multiroll mill of the type commonly known as an ink mill or paint mill. Alternatively, the mixtures can be ground in other conventional fine grinding equipment such as ball mills disc or cone mills.

While these methods are satisfactory for producing the compositions of the new invention, by far the best method, which is by no means the equivalent of the above methods, is to mill the fungicide and organic liquid together in a sand mill. Sand mills and sand grinding are described in detail, for example, in Hochberg Patent No. 2,581,414. The sand milling functions to comminute and deagglomerate the fungicide and to impart the requisite shear to the mixture.

The sand milling is carried on until sufficient agitation and shearing action has been imparted, as is indicated by a substantial thickening of the mixture, and preferably until the average particle size of the fungicide is less than 5 microns. This sand grinding practically insures the presence of a large number, usually from about 2 to 7% by weight, of particles of less than 0.1 micron in diameter.

Ordinarily, these essential functions performed by the sand grinding can be accomplished by grinding for 15 to 45 minutes. Of course, when the active ingredient initially is in an extremely finely divided and deagglomerated condition, sand grinding times as low as 5 minutes frequently are satisfactory. Conversely, sand grinding times up to 3 hours sometimes are required where the active ingredient initially is in a coarse condition and is difficult to comminute and deagglomerate and suspend homogeneously in the organic liquid. The optimum sand grinding time can be ascertained readily by those skilled in the art by simple observation.

Where ingredients other than organic liquid and fungicide are to be included in the composition, these can be added either prior to or after the milling step.

Ordinarily my concentrated compositions contain from about 10 to 60% by weight of the fungicidally active ingredient. They are in most instances pourable suspensions that are highly stable upon standing for extended periods of time. Furthermore, whatever solids do settle out of suspension do not form a packed cake on the bottom of the container, but rather form a voluminous flocculent layer that is readily redispersed with mild agitation.

These fungicidal concentrates can be extended readily with water or oil to form dilute fungicidal formulations that can be applied with conventional spraying equipment. Where the concentrates contain a water miscible organic liquid, they can be extended with water to form homogeneous dispersions of the fungicidally active ingredient in a water-organic liquid solution. Alternatively where the organic liquid in my concentrate is water immiscible, the concentrate can be emulsified by mixing with water to form a stable fungicidal emulsion. Where oil is used as the diluent, the sprayable composition ordinarily is a suspension of the active ingredient in an oil-organic liquid solution.

The thusly prepared sprayable formulations usually contain from about 0.1 to 3% by weight of the fungicidally active ingredient. They are remarkably stable against settling out of the dispersed fungicide so that no agitation ordinarily is required in the spray tank to prevent settling. Of course, if application of the dilute composition is to extend over a long period of time, mild agitation such as by recirculating is in some cases desirable.

The dilute sprayable compositions made by extending those compositions prepared by sand grinding, which contain a large number of extremely small particles of fungicide, are outstandingly effective. Apparently the presence of the large number of fine fungicide particles imparts a greatly increased activity to these compositions.

In order that the invention can be better understood, the following examples in addition to those given above are set forth.

Example 1

A mixture of 30 parts by weight of zinc ethylene bisdithiocarbamate, 5 parts by weight of alkyl, aryl polyether alcohol, 1 part by weight of polyethylene glycol 400 dioleate and 64 parts by weight of a non-phytotoxic isoparaffin hydrocarbon is combined with an equal volume of 20–30 mesh Ottawa sand and sand ground for 30 minutes. After separation of the sand, the product is a fluid oil suspension containing solid particles that are substantially all less than 5 microns in diameter. The thusly prepared concentrate is then added to water with slight agitation, giving a very stable emulsion containing 1% of the active ingredient.

The isoparaffin hydrocarbon of this composition has the following physical constants:

| | |
|---|---|
| Gravity, ° API | 49.5 |
| Specific gravity, 60/60 | 0.7818 |
| Flash point, Tag, ° F | 160 |
| Viscosity, 100° F., S. U. S | 33 |
| Unsulfonated residue, percent | 97 |
| Acid number | 0.04 |
| Distillation, ASTM, ° F.: | |
|   I. B. P | 384 |
|   10% | 394 |
|   50% | 419 |
|   90% | 477 |
|   Final B. P | 502 |

Example 2

30 parts by weight of manganese ethylenebisdithiocarbamate, 4 parts of low viscosity methyl cellulose and 66 parts of anhydrous isopropanol are mixed, and then combined with 1.5 volumes of 20–30 mesh Ottawa sand. The mixture is sand milled for 30 minutes. When separated from the sand the suspension is fluid under shear but highly thixotropic and non-settling at rest. When poured into water, the isopropanol diffuses away, leaving a very highly dispersed suspension of the fungicide, most of which is below 5 microns in particle size.

Example 3

A mixture of 40 parts tetramethyl thiuram disulfide, 5 parts of "Atlox" G–2090 (polyhydric alcohol-fatty acid condensation product), and 55.0 parts of "Soltrol"–130 (non-phytotoxic isoparaffin hydrocarbon marketed by Phillips Petroleum Company) is placed in a pebble mill and milled for 24 hours. The resulting suspension is very fluid under shear and is extremely thixotropic. When added to water with agitation a stable emulsion-suspension results.

Example 4

A mixture of 30 parts ferric ethylene bisdithiocarbamate, 5 parts of polyethylene glycol 400 dioleate, 30 parts of low viscosity pure white oil and 35 parts of a non-phytotoxic isoparaffin is combined with an equal volume of sand and sand ground for 30 minutes. The resultant product when separated from the sand is a fluid suspension of high thixotropy in which substantially all of the solid particles are less than 5 microns in diameter. When added to water with agitation a stable emulsion is formed. When sprayed on foliage the isoparaffin evaporates in 1–2 days leaving behind a tenacious layer of fungicide and white oil.

The white oil in this composition is Penn-Drake "Liteteck" oil, and has the following specifications:

Viscosity, 100° F.=50/60
Sp. g. 77° F.=0.815
Flash point, Cleve. open cup=300° F.

Other of my compositions can be prepared in accordance with the above examples but using other insoluble fungicides such as the various ones disclosed in the Tisdale and Williams patent, tetraethyl thiuram disulfide and tetramethyl and ethyl thiuram monosulfide.

I claim:

1. A readily redispersible fungicidal composition obtained by shear milling a finely divided fungicidally active compound selected from the group consisting of manganese ethylenebisdithiocarbamate, zinc ethylenebisdithiocarbamate, ferric dimethyldithiocarbamate, zinc dimethyl dithiocarbamate, manganese dimethyl dithiocarbamate, tetramethyl thiuram disulphide, tetraethyl thiuram disulphide, tetramethyl thiuram monosulfide and tetraethyl thiuram monosulfide, in water-immiscible organic liquid selected from the group consisting of deodorized kerosene, mixed isoparaffins in the boiling range of from 250°–650° F. and white oils having a viscosity of from 50–350 S. U. S. at 100° F., whereby a highly stable, homogeneous dispersion of discrete deagglomerated particles of average size less than 5 microns is produced.

2. The composition in accordance with claim 1 containing from 10–60% of said fungicidally active compounds.

3. A readily redispersible fungicidal composition obtained by shear milling a finely divided fungicidally active dithiocarbamate in a non-solvent, water-immiscible organic liquid selected from the group consisting of deodorized kerosene, mixed isoparaffins in the boiling range of from 250°–650° F. and white oils having a viscosity of from 50–350 S. U. S. at 100° F., whereby a highly stable, homogeneous dispersion of discrete deagglomerated particles of said fungicidally active compound of average size less than 5 microns is produced.

References Cited in the file of this patent

UNITED STATES PATENTS

| | | |
|---|---|---|
| 2,114,125 | Kaufman | Apr. 12, 1938 |
| 2,581,414 | Hochberg | Jan. 8, 1952 |
| 2,658,016 | Brown et al. | Nov. 3, 1953 |

OTHER REFERENCES

Frear: Pesticide Handbook, College Sci. Publ., State College, Pa., 1954, pp. 165–167.

UNITED STATES PATENT OFFICE
CERTIFICATE OF CORRECTION

Patent No. 2,870,058 January 20, 1959

Donald J. Loder

It is hereby certified that error appears in the printed specification of the above numbered patent requiring correction and that the said Letters Patent should read as corrected below.

Column 1, line 63, for "immsicible" read -- immiscible --; column 5, line 5, before "water-immiscible" insert -- a non-solvent --.

Signed and sealed this 30th day of June 1959.

(SEAL)
Attest:

KARL H. AXLINE
Attesting Officer

ROBERT C. WATSON
Commissioner of Patents